Sept. 19, 1967  B. R. DWIGHT  3,342,194

EMERGENCY GOVERNOR EXERCISER SYSTEM

Filed May 12, 1965  2 Sheets-Sheet 1

INVENTOR:
BARTON R. DWIGHT,
BY W. C. Crutcher
HIS ATTORNEY.

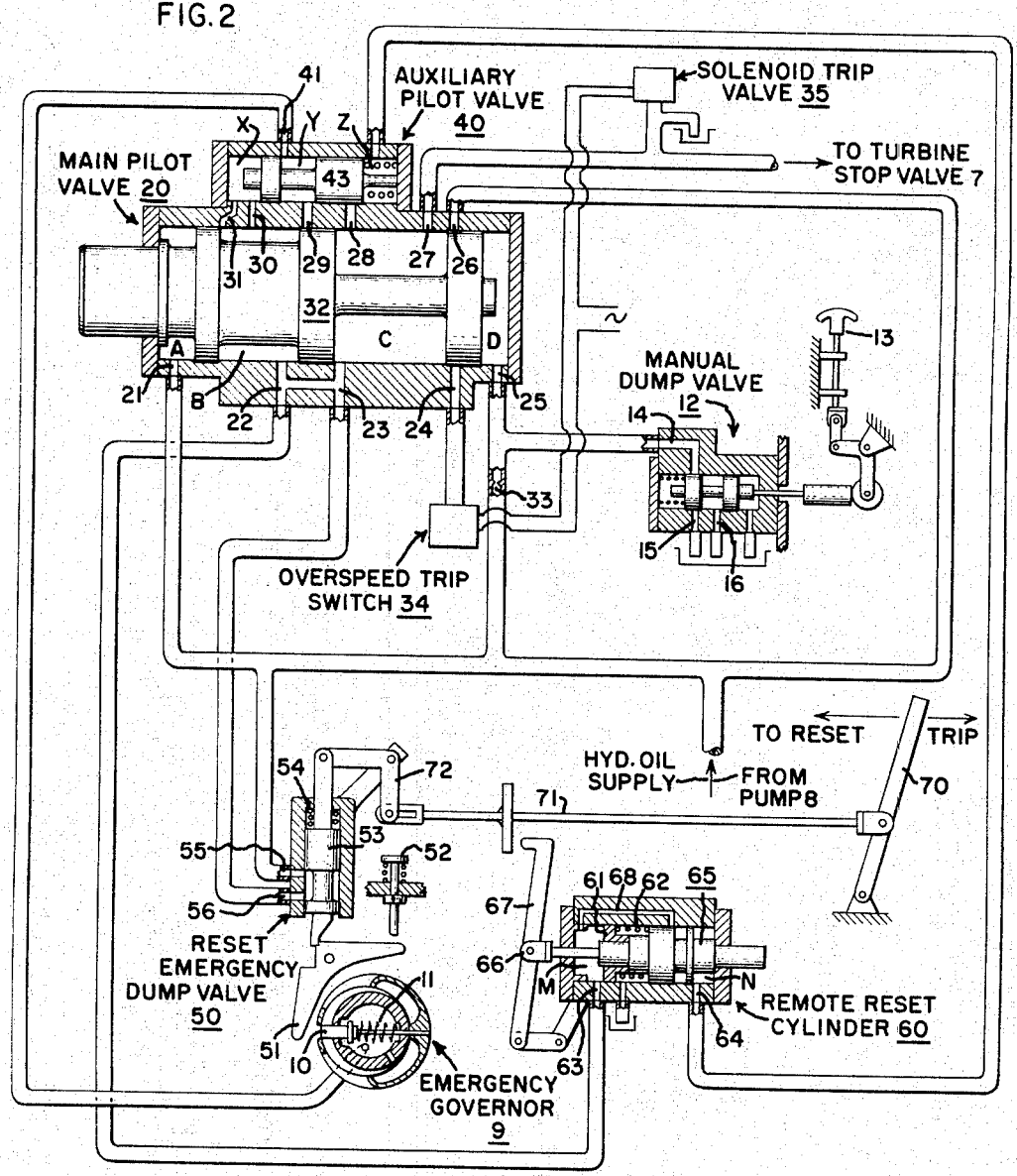

3,342,194
EMERGENCY GOVERNOR EXERCISER SYSTEM
Barton R. Dwight, Peabody, Mass., assignor to General Electric Company, a corporation of New York
Filed May 12, 1965, Ser. No. 455,061
6 Claims. (Cl. 137—24)

This invention relates generally to an improved governing system for a rotary prime mover as, for example, a steam turbine. More particularly, it relates to an exerciser for an emergency governing system by which the system can be isolated during normal operation of the prime mover and its components tested or exercised.

A conventional steam turbine powerplant often includes both a throttle valve, which is controlled by a "main" governor to regulate the flow of motive fluid to the turbine in accordance with load demands, and a stop valve, which is actuated by an "emergency" governor to completely shut off the flow of motive fluid in case the turbine overspeeds. In actual service, the emergency governor system is rarely called upon to function. But, since its reliability is absolutely necessary, it is important to have a means by which the emergency governor system can be tested or exercised from time to time to keep moving parts free without shutting down the turbine and without losing the overspeed protection which the system provides.

Patent 2,998,017 issued Aug. 29, 1961, to Albert L. Cavalieri and assigned to the assignee of the present application, discloses another type of emergency governor exerciser. In the Cavalieri system, during the time when the "emergency governor" is isolated for testing, a speed responsive "secondary governor" is in control of the valve by which the emergency governor is isolated. If there is an overspeed during the time of testing, the "secondary governor," by its control over the valve, brings the "emergency governor" out of isolation whereupon it is able to perform its function in the normal manner.

Although the aforesaid Cavalieri system provides adequate overspeed protection while the emergency governor is being tested, it nevertheless is still dependent upon recourse to the emergency governor for ultimate and actual turbine shutdown.

Accordingly, it is an object of this invention to provide a simplified emergency governor exerciser system which will permit testing or exercising of the emergency governor while the turbine is operating.

Another object is to provide a simplified emergency governor exerciser system which will provide independent overspeed protection when the emergency governor is being exercised.

Another object is to provide an emergency governor exerciser which will automatically reset the governor after putting it through one complete operating cycle.

These and other objects, advantages and features of this invention will be readily appreciated from the following description when considered in connection with the accompanying drawings, wherein—

FIG. 2 is a detailed schematic diagram of the emergency governor and its exerciser system shown in its normal condition during operation of the turbine.

Briefly stated, the present invention provides an emergency governor exerciser in which, when the emergency governor is isolated for testing and by the very fact of its isolation, another independent speed sensing element is exposed to operating conditions and is by itself able to shut down an overspeeding turbine without recourse to the emergency governor.

Figure 1:
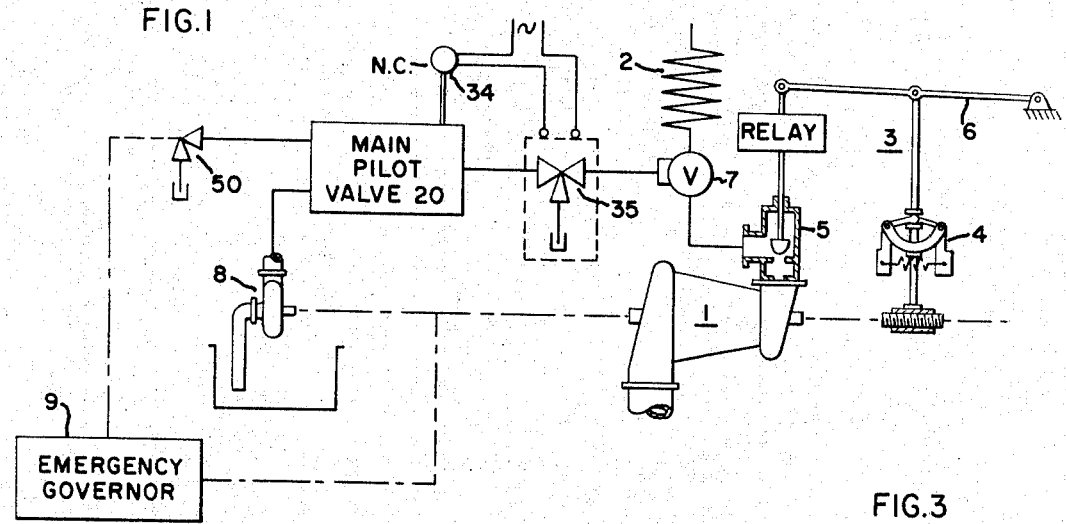
FIG. 1 is a simplified schematic diagram illustrating the environment of the emergency governor and the governor exerciser of this invention in relation to the overall powerplant.

Referring now to FIG. 1 by way of example, a prime mover such as a steam turbine 1 is furnished with motive fluid from a steam generator 2. A main governing mechanism 3 includes a flyball governor 4, a steam control valve 5 and an operating lever 6. Governing mechanism 3 regulates the speed of the turbine in the conventional manner and is not a part of the present invention. A hydraulically operated stop valve 7 is also provided between the steam generator 2 and turbine 1. A centrifugal pump 8 driven by turbine 1 furnishes hydraulic fluid pressure to stop valve 7 to hold it open. Loss of pressure to stop valve 7 will cause it to close, shutting off steam flow to turbine 1. An emergency centrifugal governor 9 is geared to the turbine shaft in a suitable manner so as to turn therewith. At a predetermined overspeed condition, generally about 110% of rated speed, emergency governor 9 will actuate an emergency dump valve 50, discharging hydraulic fluid and closing stop valve 7 to shut down the turbine 1.

In addition to the above basic elements described in their environment, and referring generally to FIG. 2, the system also includes a main pilot valve 20 which is a slidable spool valve with four lands on its spool and four chambers A, B, C, and D. Communicating with chamber D and with atmosphere is a manual dump valve 12 which is operable by handle 13. An auxiliary pilot valve 40 of the slidable spool type has two lands on its spool and three chambers X, Y, and Z which communicate selectively with chambers B and C during the operation of the system as will be hereinafter described. A remote reset cylinder 60 is a double acting cylinder with chambers M and N communicating with chambers B and Z respectively. Cylinder 60 is operably connected to reset emergency dump valve 50. A lever 70 is also provided for manual resetting of emergency dump valve 50 if that should be desired.

A normally-open three-way valve 35, electrically operated by a solenoid is provided in the hydraulic line to stop valve 7. Solenoid valve 35 is electrically connected to a pressure switch or overspeed trip switch 34 which communicates with chamber C when the emergency governor is being exercised. Under normal operating conditions, chamber C is not in direct communication with pressure switch 34.

In view of the foregoing description, it is appropriate to restate that this invention provides a means by which emergency governor 9 can be exercised or tested without overspeeding the turbine and without causing the turbine stop valve to close, while at the same time affording complete protection to the operating turbine.

Referring again to FIG. 2, during normal operation of the turbine, its stop valve 7 is held open by hydraulic pressure from pump 8 through emergency dump valve 50 and main pilot valve 20 in which ports 21, 22, 23, 25, 27, 30 and 31 are open and ports 24, 26, 28, and 29 are closed. Hydraulic pressure from pump 8 to the hydraulic operator of steam valve 7 in this normal condition is exerted through ports 23 and 27 of valve 20. At the same time ports 21, 22, 23 and 25 are exposed to the same pressure from pump 8. Therefore, each of chambers A, B, C and D is under the same pressure. Due to the difference in the piston areas in chambers A and D, the piston 32 will remain at the left as shown in FIG. 2.

The first step in the operation of the emergency governor exerciser is to isolate the emergency governor by opening manual dump valve 12 by its handle 13. This allows port 25 of the main pilot valve 20 through port 14 of the manual dump valve 12 to communicate with either or both of ports 15 and 16 of the manual dump valve, dumping hydraulic fluid from chamber D of the main pilot valve causing piston 32 to move to the right. Chamber A is also relieved of hydraulic pressure, but there is an orifice 33 in the line between chamber A and manual dump valve 12 which retards the loss of pressure in chamber A and the pressure in chamber A moves piston 32 to the right.

Figure 3:
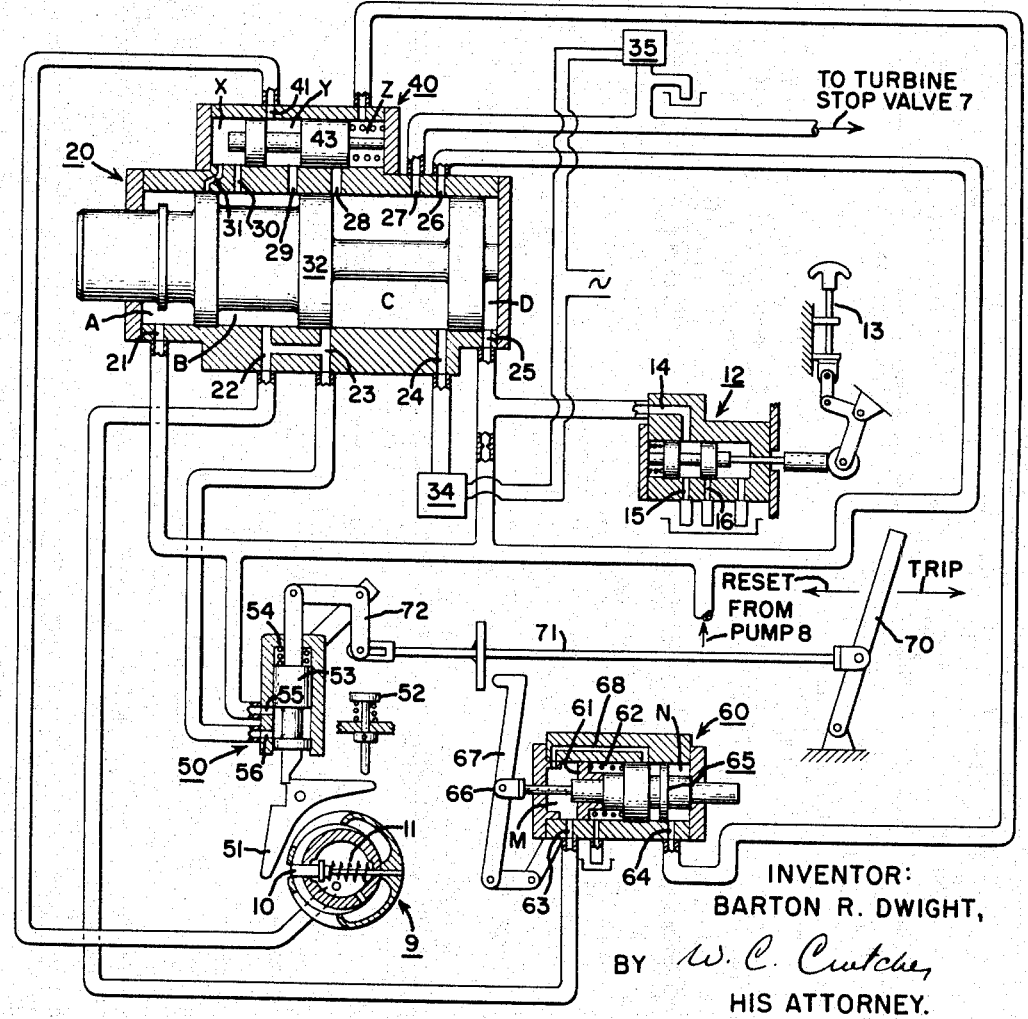
FIG. 3 shows the system of FIG. 2 immediately after the emergency governor has been isolated from the turbine stop valve.

FIG. 3 shows the emergency governor exerciser system with piston 32 of main pilot valve 20 shifted to the right with the following resulting conditions:

Port 23 is closed, isolating the emergency governor 8 from turbine stop valve 7.

Port 26 is open allowing hydraulic pressure into chamber C and to turbine stop valve 7, replacing the pressure in chamber C from port 23 which is now closed.

Port 24 is open allowing an overspeed trip switch or pressure switch 34 to sense pressure from pump 8. The pump pressure is dependent on turbine speed. Switch 34, upon sensing excess pressure from pump 8, operates solenoid valve 35 to open the same, causing turbine stop valve 7 to close. Thus the pressure switch acts as a second independent overspeed governor protecting the turbine while emergency governor 9 is isolated.

Port 31 is closed.

Port 29 is open, allowing hydraulic oil to flow through chamber Y to emergency governor 9 for the purpose of exercising it in its now isolated condition, as will now be described.

Emergency governor 9 is of the "off center bolt" type and includes an off center member 10 held in a retracted position by a spring 11 and which is actuated by centrifugal force against spring 11 when the turbine overspeeds. In ordinary practice, the spring is adjusted so that at about 110% of rated speed the member 10 will move radially against spring 11 into a position such that it will strike and trip a lever 51 which actuates emergency dump valve 50. The governor 9 may, for test purposes, be tripped at a lower speed as, for example, normal operating speed, by the admission of oil which adds mass to the off center member structure 10. The added mass will of course cause radial movement of member 10 at a lower speed. This oil is supplied from main pilot valve 20 through port 29, through auxiliary pilot valve 30 and port 41 as shown in FIG. 3. A manual trip button 52 is provided for manual tripping of the lever 51 if that should be desired. Tripping of emergency dump valve 50 by lever 51 allows piston 53 to move under the influence of spring 54 to close port 55 and open port 56 to atmosphere. The expected action of the emergency governor during overspeed, as shown by the normal operating positions of the valves in FIG. 2, is to actuate trip finger 51 and dump oil through port 56 to close turbine stop valve 7. Under the exercise conditions as above described, however, the effect of dumping through port 56 is to initiate resetting of the emergency dump valve 50 as will now be described.

The release of fluid through port 56 relieves pressure in chamber B of main pilot valve 20, and therefore also in chamber X of auxiliary pilot valve 40, causing piston 43 to move to the left. Relief of pressure in chamber B is accompanied by loss of pressure in chamber M of a double acting remote reset cylinder 60. As for auxiliary pilot valve 40, this results in closing ports 29 and 30 and opening port 28 by which hydraulic pressure of chamber C communicates with chamber N of remote reset cylinder 60.

When reset cylinder 60 loses pressure in chamber M, piston 61 moves to the left under the influence of spring 62 and covers port 63. At the same time, chamber N is being pressurized at port 64, causing piston 65 to move to the left. The leftward movement of pistons 61 and 65 is transmitted through levers 66, 67, 71 and 72 to reset emergency dump valve 50. The movement of piston 65 to the left opens passage 68, which communicates with chamber M, to pressure from chamber N. This pressure on piston 61 moves it to the right against spring 62 and against piston 65 due to the differential in working areas of pistons 61 and 65. Before piston 65 is moved so far to the right as to cut off the pressure to piston 61 through passage 68, port 63 is open. Since the emergency dump valve is reset, pressure is again built up in the line to port 63 which returns pistons 61 and 65 to their normal righthand stop position.

In a simpler embodiment of this invention, if the automatic reset is not desired, the lines to ports 63 and 64 need only be blanked off and manual reset can be accomplished by lever 70 and linkage 71 and 72 connected to piston 53.

Upon closing of dump valve 12, pressure will build up in chamber D moving piston 32 to its normal lefthand position. Chamber B will thereupon supply pressure to chamber X through port 31, moving piston 43 to its normal righthand position. Emergency governor 9 is once again in communication with stop valve 7 and the system is in normal operation.

In summary, the emergency governor exerciser system just described has isolated the emergency governor, exercised it through one complete cycle, and put it back into service without changing turbine speed, without shutting down the turbine stop valve, and without losing any overspeed protection in the meantime.

While, for purposes of description, this invention has been related to its use with a steam turbine, it will be obvious to those of ordinary skill in the art that the inventive concept embraces other uses as, for example, gas turbines and diesel engines. Accordingly, it is intended that the invention be not limited by the environment in which it has been described, but that it encompass all modifications within the purview of the following claims.

What is claimed is:

1. An emergency governor exerciser system for a prime mover comprising:
  (a) a stop valve, controlling the flow of energy to said prime mover, said stop valve having a fluid actuated operator,
  (b) a source of fluid pressure connected to the operator of said stop valve and responsive to the speed of said prime mover,
  (c) first relief means to relieve said fluid pressure for closing said stop valve,
  (d) first governor means responsive to overspeed of said prime mover to actuate said first relief means,
  (e) second relief means to relieve said fluid pressure, closing said stop valve,
  (f) second governor means responsive to the pressure from said fluid pressure source to independently actuate said second relief means,
  (g) a main pilot valve communicating with said source of fluid pressure, said stop valve operator, said first relief means, and said second governor means, said main pilot valve having a "run" position in which said stop valve operator and said first relief means are in communication, and a "test" position in which said stop valve operator and said second governor means are in communication,
  (h) means to switch said main pilot valve from said "run" to said "test" position,
  (i) means to artificially actuate said first governor means at a speed below that is which said first governor means will actuate during overspeed,
  (j) and means to reset said first relief means subsequent to its actuation by said first governor means.

2. An emergency governor exerciser system according to claim 1 in which said second relief means comprises a solenoid operated valve and said second governor means comprises a pressure sensitive switch operatively connected to said solenoid operated valve.

3. An emergency governor exerciser system according to claim 1 in which said means to reset said first relief means comprises:
 (a) a double acting cylinder operatively juxtaposed to a reset linkage by which said first relief means is reset upon actuation of said double acting cylinder in one direction,
 (b) an auxiliary pilot valve, operatively connected to said double acting cylinder and to said main pilot valve, responsive to positions of said main pilot valve, to control the action of said double acting cylinder.

4. An emergency governor exerciser system for a turbine comprising:
 (a) a fluid operated stop valve controlling the flow of motive fluid to said turbine,
 (b) a fluid pump supplying fluid pressure to the operator of said stop valve, said pump being driven by said turbine,
 (c) an emergency dump valve to relieve said fluid pressure closing said stop valve,
 (d) a centrifugal governor operatively connected to said turbine and to said emergency dump valve to actuate said dump valve upon overspeed of said turbine,
 (e) a solenoid operated dump valve to relieve said fluid pressure closing said stop valve,
 (f) a pressure sensitive switch responsive to fluid pressure from said pump and operatively connected to said solenoid valve to independently actuate said solenoid valve upon sensing excessive pump pressure,
 (g) a main pilot valve communicating with said pump, said stop valve operator, said emergency pump valve, and said pressure sensitive switch, said main pilot valve having a "run" position in which said stop valve operator and said emergency dump valve are in communication with each other and with said pump, and a "test" position in which said stop valve operator and said pressure sensitive switch are in communication with each other and with said pump,
 (h) a means to switch said main pilot valve from said "run" to said "test" position,
 (i) means to artificially actuate said centrifugal governor at a speed below that at which said governor will actuate naturally, and
 (j) means to reset said emergency dump valve subsequent to its actuation by said centrifugal governor.

5. An emergency governor exerciser system according to claim 4 in which said means to reset said emergency dump valve comprises:
 (a) double acting cylinder operatively juxtaposed to a reset linkage by which said dump valve is reset upon actuation of said double acting cylinder in one directon, and
 (b) an auxiilary pilot valve, operatively connected to said double acting cylinder and to said main pilot valve, responsive to positons of said main pilot valve, to control the action of said double acting cylinder.

6. An emergency governor exerciser system for a rotary prime mover comprising:
 (a) a fluid operated stop valve controlling the flow of fluid to said prime mover,
 (b) a source of fluid pressure to the operator of said stop valve responsive to the speed of said prime mover,
 (c) a first relief means to relieve said fluid pressure closing said stop valve,
 (d) a first governor means responsive to the speed of said prime mover to actuate said first relief means,
 (e) a second relief means to relieve said fluid pressure, closing said stop valve,
 (f) a second governor means responsive to the pressure from said fluid pressure source to independently actuate said second relief means, and
 (g) means to concurrently
  (i) isolate said first relief means and said first governor means from operative connection to said fluid operated stop valve, and
  (ii) bring said second relief means and said second governor means into operative connection to said fluid operated stop valve while actuating the first relief means to test the first governor means.

References Cited
UNITED STATES PATENTS

| | | | |
|---|---|---|---|
| 2,617,438 | 11/1952 | Doran | 137—24 |
| 2,866,470 | 12/1958 | Hold | 137—24 |
| 2,926,680 | 3/1960 | Eggenberger | 137—24 |
| 2,998,017 | 8/1961 | Cavalieri | 137—24 |

CLARENCE R. GORDON, *Primary Examiner.*